(12) United States Patent
Mayr (10) Patent No.: US 11,731,304 B2
(45) Date of Patent: Aug. 22, 2023

(54) METHOD FOR PRESSING AND CUTTING A PRODUCT PIECE AND CUTTING MACHINE THEREFOR

(71) Applicant: TVI ENTWICKLUNG AND PRODUKTION GMBH, Bruckmuehl (DE)

(72) Inventor: Martin Mayr, Eiselfing (DE)

(73) Assignee: TVI ENTWICKLUNG AND PRODUKTION GMBH, Bruckmuhl (DE)

( * ) Notice: Subject to any disclaimer, the term of this patent is extended or adjusted under 35 U.S.C. 154(b) by 120 days.

(21) Appl. No.: 17/552,009

(22) Filed: Dec. 15, 2021

(65) Prior Publication Data

US 2022/0193942 A1 Jun. 23, 2022

(30) Foreign Application Priority Data

Dec. 21, 2020 (DE) .......................... 102020134505.4

(51) Int. Cl.
*B26D 5/20* (2006.01)
*A22C 7/00* (2006.01)
(Continued)

(52) U.S. Cl.
CPC .............. *B26D 5/20* (2013.01); *A22C 7/0023* (2013.01); *A22C 17/002* (2013.01); *B26D 7/30* (2013.01); *B26D 2210/04* (2013.01)

(58) Field of Classification Search
CPC .......... B26D 5/20; B26D 7/30; A22C 17/002; A22C 17/0023
See application file for complete search history.

(56) References Cited

U.S. PATENT DOCUMENTS 4,967,652 A * 11/1990 Maliy .................. A22C 7/0023
100/153
5,163,865 A * 11/1992 Smith .................... A22C 25/18
83/956
(Continued)

FOREIGN PATENT DOCUMENTS

DE    10 2004 041 881 A1    10/2006
DE    10 2018 106 300 A1    9/2019
(Continued)

OTHER PUBLICATIONS

German Search Report dated Jun. 23, 2021 (with partial English Machine Translation), Application No. 10 2020 134 505.4, Applicant TVI Entwicklung und Produktion GmbH, 7 Pages.
(Continued)

*Primary Examiner* — Sean M Michalski
(74) *Attorney, Agent, or Firm* — Brooks Kushman P.C.

(57) ABSTRACT

In order to be able to slice product pieces, whose cross-section varies along their length, into weight-accurate slices, after pressing to a uniform product caliber it is possible to measure these realistically in terms of cross-sectional area and length and not in a pumped up state of the machine. On the one hand, this is promoted by the fact that even before pressing, a cross-press stamp is set to a forming tube cross-section oriented to the unpressed product piece. On the other hand, this is promoted by the fact that after pressing, by lowering pressing force to a substantially lower holding force, it is possible to deform back the deformed, pumped up machine parts before measuring the product caliber.

20 Claims, 6 Drawing Sheets

(51) Int. Cl.
 *A22C 17/00* (2006.01)
 *B26D 7/30* (2006.01)

(56) References Cited

U.S. PATENT DOCUMENTS

| | | | | |
|---|---|---|---|---|
| 5,585,603 | A * | 12/1996 | Vogeley, Jr. | G01G 9/005 |
| | | | | 177/1 |
| 5,937,080 | A * | 8/1999 | Vogeley, Jr. | B26D 7/30 |
| | | | | 382/110 |
| 6,045,071 | A * | 4/2000 | Emsens | A22C 17/02 |
| | | | | 241/101.4 |
| 6,407,818 | B1 * | 6/2002 | Whitehouse | G01B 11/00 |
| | | | | 356/627 |
| 10,245,745 | B2 * | 4/2019 | Völkl | A22C 17/02 |
| 11,213,037 | B2 * | 1/2022 | Völkl | A23P 30/10 |
| 2006/0162518 | A1 * | 7/2006 | Biggs | B26D 7/30 |
| | | | | 83/77 |
| 2017/0035066 | A1 * | 2/2017 | Hukelmann | A23L 13/03 |
| 2019/0030740 | A1 * | 1/2019 | Grasselli | B26D 7/0625 |
| 2019/0281843 | A1 * | 9/2019 | Völkl | A23P 30/10 |
| 2021/0227840 | A1 * | 7/2021 | Blaine | B26D 5/007 |
| 2021/0354325 | A1 * | 11/2021 | Voelkl | B26D 7/32 |
| 2023/0135169 | A1 * | 5/2023 | Mayer | B26D 7/0683 |
| | | | | 99/537 |

FOREIGN PATENT DOCUMENTS

DE 102019110313 B3 7/2020
WO 2020/212246 A1 10/2020

OTHER PUBLICATIONS

European Search Report dated May 24, 2022 (with partial English Machine Translation), Application No. 21210458.2-1105, Applicant TVI Entwicklung und Produktion GmbH, 14 Pages.

* cited by examiner

METHOD FOR PRESSING AND CUTTING A PRODUCT PIECE AND CUTTING MACHINE THEREFOR

CROSS-REFERENCE TO RELATED APPLICATIONS

This application claims priority to German Patent Application No. DE 10 2020 134 505.4 filed on Dec. 21, 2020, the disclosure of which is incorporated in its entirety by reference herein.

TECHNICAL FIELD

The invention relates to the pressing of a product piece which is virtually incompressible due to its high liquid content, consisting of a material which behaves more elastically or more plastically depending on the boundary conditions, such as a piece of grown meat.

Such a product piece, which in its initial state has a varying cross-section over its length, is pressed to a cross-section which is the same over the length and then cut into slices, in particular slices which are as accurate as possible in weight.

BACKGROUND

For the purposes of the present invention, meat pieces will often be referred to hereinafter without limiting the invention to this particular type of a product piece.

The production of weight-accurate slices or portions from a strand is relatively easy if the strand has the same cross-section everywhere along its length, hence called caliber, and consists of a homogeneous material which is the same everywhere and has limited elasticity, such as sausage or cheese, and which, in addition, is usually somewhat compressible, since it consists to a substantial extent of coagulated protein.

For this purpose, so-called slicers are known, which usually cut off one slice at a time with a rotating, round or spiral-shaped blade, which can be moved forwards and backwards, e.g., transversely to the caliber, while the caliber, which is usually freely exposed in the process, is moved forwards continuously.

However, an irregularly shaped product piece of grown meat, e.g., an upper part, does not have these characteristics, because each piece has a different size and shape and, moreover, a cross-section that changes over its length and consists of material portions of different consistency, elasticity and compressibility, for example fat, water, muscle tissue, the surrounding silverskin and, if necessary, also bones as in the case of a cutlet strand, which behave very differently mechanically.

Furthermore, it should be clear that a grown piece of meat is generally an elongated muscle strand, which has a much greater deformability and plasticity in its longitudinal direction, i.e., the direction in which its muscle fibers run, than transversely to this, because lengthening and shortening of the muscle is its task.

In this context, it is already known to first deform such an irregularly shaped product piece in such a way that it has a defined, known cross-section at least at the end where the next slice is cut off, preferably over the entire length, in particular at the time the slice is cut off.

Then a relation between the adjustable thickness of the slice and the desired weight of the slice can be established, although not exactly, since from one slice to the next the composition of the meat, whose components have different specific weights, may already change.

To achieve this deformation, the—usually slightly frozen—product piece is usually first inserted into a circumferentially closed forming tube with a constant internal cross-section over its length, and pressed axially against a stop by means of a longitudinal press stamp so that the product piece fills the entire internal free space of the forming tube and thus also its cross-section, thus forming a uniform product caliber.

Forming tubes of different cross-sections can be used, depending on the cross-section and also the shape of the product piece.

Furthermore, the inner cross-section of the forming tube can also be changed after insertion of the product piece, for example by moving two opposing side walls of the forming tube towards each other, thus also causing transverse compression of the product piece.

Usually, for this purpose—viewed in the longitudinal direction—a suitable transverse press stamp is radially inserted into the open side of a forming tube channel, which thus forms part of the wall of the forming tube.

This is because, starting at a certain initial cross-section of the inner free space of the forming tube, pressing in only one direction, for example in the longitudinal direction only, requires considerably more pressing by shortening of the product piece than if the forming operation is divided into two or even three different pressing directions.

This protects the internal structure of the product piece, which is often a directed structure, for example in the case of the muscle portion of an elongated piece of meat, directed in the direction of the greatest extension of the piece of meat, its longitudinal direction, which is approximately the direction in which the muscle fibers run. The piece of meat is inserted into the forming tube in such a way that its longitudinal direction corresponds approximately with the longitudinal pressing direction and the feed direction during subsequent cutting.

At the end of pressing, the position of the pressing stamps is also used to calculate the cross-section and length, and thus the volume and weight, of the pressed product piece in order to determine the thickness of a slice that is to have a certain weight.

It is already known from DE 10 2018 106 300 A1 that during pressing, the maximum pressing force—usually specified for the individual pressing directions—is approached in steps and with relief steps in between—in order to protect the structure of the meat—with increasing pressing force.

The maximum pressing force must be equal to or higher than the caliber pressing force at which all cavities, e.g., in the corners of the forming tube, are first filled by the material of the product piece.

The measuring force applied to the individual pressing stamps to finally determine the length and cross-section of the pressed piece of meat and from this to determine the necessary slice thickness for a given slice weight can be lower than the caliber pressing force, since the change in shape achieved during pressing is retained even with a much lower measuring force because of the only partial plasticity of the material.

The problem is that the pressurized product caliber, which is virtually incompressible, such as a grown piece of meat, passes on the pressure to the surrounding machine parts, i.e., the parts of the forming tube and the press stamp, as well as the stop against which the product piece is pressed, and tries to expand the forming tube cavity, which in the jargon is called inflating the forming tube.

If, in such an inflated machine state, the length and/or cross-section of the pressed product caliber is determined and from this the nominal thickness of the slices to be cut off, the first slices in particular have a strong overweight, since, for example, the transverse distance of the side walls of the forming tube, measured and taken as a basis in the unloaded state, was in reality greater due to the inflation, even when the slice is cut off, because the feed force applied to the longitudinal press stamp during cutting for pushing the product piece forward usually corresponds approximately to the measuring force.

SUMMARY

It is therefore the object of the invention to provide a method and a slicing machine with pressing of the product piece, by means of which the target weight of the slices can be achieved more accurately.

According to a 1st aspect of the invention, not only the weight but also the length of the product piece is determined before it is inserted into the forming tube, i.e., in the still unpressed state.

This has the advantage that an average cross-section of the product piece in the unpressed state can be determined, and depending thereon the size of the free inner cross-section of the forming tube can be adjusted to a size approximately in the range of the determined average cross-section of the unpressed product piece.

If the product piece is then longitudinally pressed in the forming tube by pressing in the longitudinal direction between a longitudinal press stamp and a stop at the other end, only a relatively small deformation of the product piece is carried out in the transverse direction.

This is advantageous and protects the internal structure of the product piece, since the muscle fibers running in the feed direction, the longitudinal direction of the product piece, the muscle fibers can be pushed past each other well in the longitudinal direction, but can change their relative position to each other less easily in the transverse direction.

Accordingly, the length and cross-section of the now uniform product caliber determined in the pressed state—by means of the position of the longitudinal press stamp and transverse press stamp—yield realistic values, so that the thickness setting calculated therefrom for the slices to be separated yields actual weights very close to the target weight.

In the range of the average cross-section, this should mean that the inner free cross-section of the forming tube is set to a value which deviates from the average cross-section of the unpressed product piece by a maximum of +/−30%, better by a maximum of +/−20%, better by a maximum of only +/−10% or better by a maximum of only +/−5%.

Preferably, the deviation is only upwards, or the average cross-section determined is selected as the adjusted free cross-section.

This has proved to be most useful in practice.

For the determination of this deviation, in particular an upward deviation, the shape of the unpressed product piece is taken into account, which as a rule remains approximately the same qualitatively within a batch of product pieces to be cut, although it may differ quantitatively.

The consistency of the product piece, in particular its assumed compressibility in the transverse direction, can also be taken into account.

If, for example, the product piece is strongly convex when viewed from the side, i.e., its cross-section is much larger in the central length region than at its ends, the deviation, in particular the positive deviation, will be kept very small or no positive deviation will be made, but even a negative deviation.

This is because, due to the strongly convex shape, the cavities in the front and rear areas could hardly be filled without completely dissolving, i.e., destroying, the inner structure of the product piece in these areas, which is not intended. Without such destruction, however, the cavities would not be completely filled, which would then in turn result in an incorrect target thickness for the slices to be separated.

According to a 2nd aspect of the invention, which may be combined with the 1st aspect, a different procedure is followed after pressing the product piece to a uniform product caliber than previously known:

To compress the product piece until no unfilled cavities remain in the forming tube, a force is required which is referred to as the caliber pressing force.

During pressing, therefore, pressing is carried out at least up to such a caliber pressing force—which, like all pressing forces with stamps acting in different directions, is specified separately for each stamp—and sometimes even with a somewhat higher pressing force, the so-called maximum pressing force. The aim is not only to achieve the shape of the caliber, but also to stabilize it even better by overpressing, in order to keep the deformation of the product caliber—which is limited due to only partial elasticity—as low as possible when the pressing force is subsequently reduced.

According to the invention, in this 2nd aspect, after pressing with the caliber pressing force or even a higher maximum pressing force, measurement is not carried out with such a high force as a measuring force, but rather the applied caliber pressing force or even maximum pressing force is first reduced to a holding force at the individual pressing stamps, the value of which is less than 50% of the previously applied caliber measuring force or maximum pressing force.

Preferably, the holding force is even set only to a value between 10% and 40%, better between 10% and 30%, better between 10% and 20% of the applied maximum pressing force, in particular the caliber pressing force.

Since the reset forces of the deformed parts of the inflated machine, in particular of the forming tubes, are higher than this holding force, the deformed, generally elastic, parts will move back to their uninflated initial state, for which they get preferably a certain holding time, i.e., application time of the lower holding force, but this is so short, namely possibly only 0.1 seconds, better 0.3 seconds, better 1.0 seconds or better 3.0 seconds, that this causes only relative little delay of the production process.

After that the measurement of the pressed product caliber in terms of length and cross-section is carried out by means of the position of the corresponding press stamp, whereby a measuring force is applied during measurement which is approximately in the range of the holding force.

In this case, approximately in the range means that the measuring force is a maximum of 20%, better a maximum of 10%, better a maximum of 5% above the value of the holding force or, in particular, corresponds to the value of the holding force. From practical experience this has been found to be the optimum range.

Preferably, the pressing is carried out in a forming tube which has a circumferentially closed forming cavity, but open on both ends, which has a constant cross-section along its longitudinal direction. The pressing in the longitudinal direction is carried out by means of a longitudinal press stamp which has a surface corresponding to the cross section of the forming cavity into which it is inserted in the longitudinal direction.

The transverse press stamp forms part of the circumferential wall of the forming tube.

If the longitudinal press stamp has a fixed stamp surface which is not adjustable in size, the transverse press stamp is retracted to one of a number of predetermined transverse positions, each corresponding to cross-sectional surfaces for which there is a longitudinal extrusion stamp, which must then be replaced accordingly.

If the longitudinal press stamp has a variable cross-section in the direction of transverse pressing, this is not necessary.

The control parameter for the press strokes can be only the press force or the position of the press stamp in its press direction. Especially in longitudinal direction, the control parameter will rather be the pressing force, while as shown above for a non-variable longitudinal press stamp, the control parameter for the transverse press stamp must be its position to be approached.

Pressing is continued in each case until a target value of the control parameter specified for the respective pressing stroke is reached, whereby the target value can be reached in several stages, and between the stages relief strokes, i.e., a stop or even backward movement of the corresponding press stamp, are also possible to protect the product structure.

When a press stamp moves forward, this can also be stopped before the target value of the control parameter is reached if the feed speed of the press stamp—especially if the control parameter is the press force—drops below a predefined limit value, since this means that the press stamp is facing a very high resistance from the product piece.

Accordingly, this is more likely to be the case for longitudinal pressing than for transverse pressing.

Preferably, transverse pressing can be carried out not only in one but in two different transverse directions to the longitudinal pressing direction, the direction of feed during slicing, or at least in a second transverse direction the forming tube cross-section can be adjusted between a large value for insertion of the product piece and a small value corresponding approximately to the thickness of the product piece in this direction.

If, after determining the length and cross-section of the pressed product caliber, the target thickness for the slices is determined from this and the product caliber is cut with corresponding thickness settings for the slices that are to produce such a target thickness, a feed force must be defined with which the longitudinal press stamp pushes the product caliber forward in the forming tube between the cutting of the individual slices in each case and presses it against the stop.

This feed force must, of course, be sufficiently high to cause any forward movement in the forming tube at all, i.e., to overcome the static friction in the longitudinal direction between the product caliber and the forming tube, which depends on many factors. Preferably, however, a feed force is selected that is in the range of the measuring force, in particular 5% to 20% above the measuring force.

Among other things, this has the advantage that the thickness setting to be made on the machine for the slice to be cut off, i.e., usually the axial distance between the front end, the cutting end, of the forming tube and a stop plate placed in front of it, corresponds approximately to the target thickness of the sheet that is pressure-free again after cutting off, which gives the target weight.

The slicing machine according to the invention comprises—as already explained with regard to the method—according to the state of the art a forming tube open at both end faces, in which a longitudinal press stamp is guided displaceably in the longitudinal direction of the forming tube, as well as a transverse press stamp, which represents a part of the wall of the forming tube, for example in that the remainder of the forming tube forms a forming tube channel, into the open side of which the transverse press stamp can be inserted with a precise fit.

The free inner cross-section of the forming tube is preferably not round, but usually has two opposing side walls running parallel to one another and is in particular rectangular or parallelogram-shaped, in each case with strongly rounded corners.

Preferably, the longitudinal press stamp has a variable extension of its extrusion surface in the transverse extrusion direction in which the transverse press stamp can be moved, and if the two side walls of the forming tube channel running parallel to one another are adjustable in their mutual spacing, the transverse press stamp and the longitudinal press stamp must also have a variable size in the transverse direction in order to be able to adapt to the spacing between the walls of the forming tube channel.

The machine may also comprise several such forming tubes arranged with their longitudinal directions parallel side by side, the pressing stamp and pressing method of which are then preferably controllable independently of each other.

In particular, the machine requires an axial stop for the product caliber, against which the longitudinal press stamp can press the product caliber, as well as a cutting unit, preferably a blade, which is movable in axial direction in front of the front cutting end of the forming tube in transverse direction to its longitudinal direction for cutting off a slice.

The axial stop preferably completely closes the cross section of the forming tube, preferably already at the start of pressing, and is either arranged directly on the cutting-side, the front end face of the forming tube, or can be inserted transversely into the forming tube, somewhat set back from the latter, as a so-called intermediate plate.

As a stop element directly on the end face, it is also possible to use directly the stop plate which, during the subsequent slicing of the product caliber, specifies the thickness of the slice to be cut with regard to its longitudinal position relative to the blade and/or the forming tube.

Most importantly, such a known machine also comprises a control which controls all moving parts of the machine.

According to the invention, the control of the machine is capable of controlling the moving parts of the machine according to the method previously described.

For this purpose, the machine may also comprise sensors that measure parameters relevant to the control process, for example pressure sensors, force sensors or position sensors on the press stamps, pressure sensors or force sensors at the inner surfaces of the forming tube and/or on the longitudinal stop.

BRIEF DESCRIPTION OF THE DRAWINGS

Embodiments according to the invention are described in more detail below by way of example. They show.

DETAILED DESCRIPTION

Figure 1A:
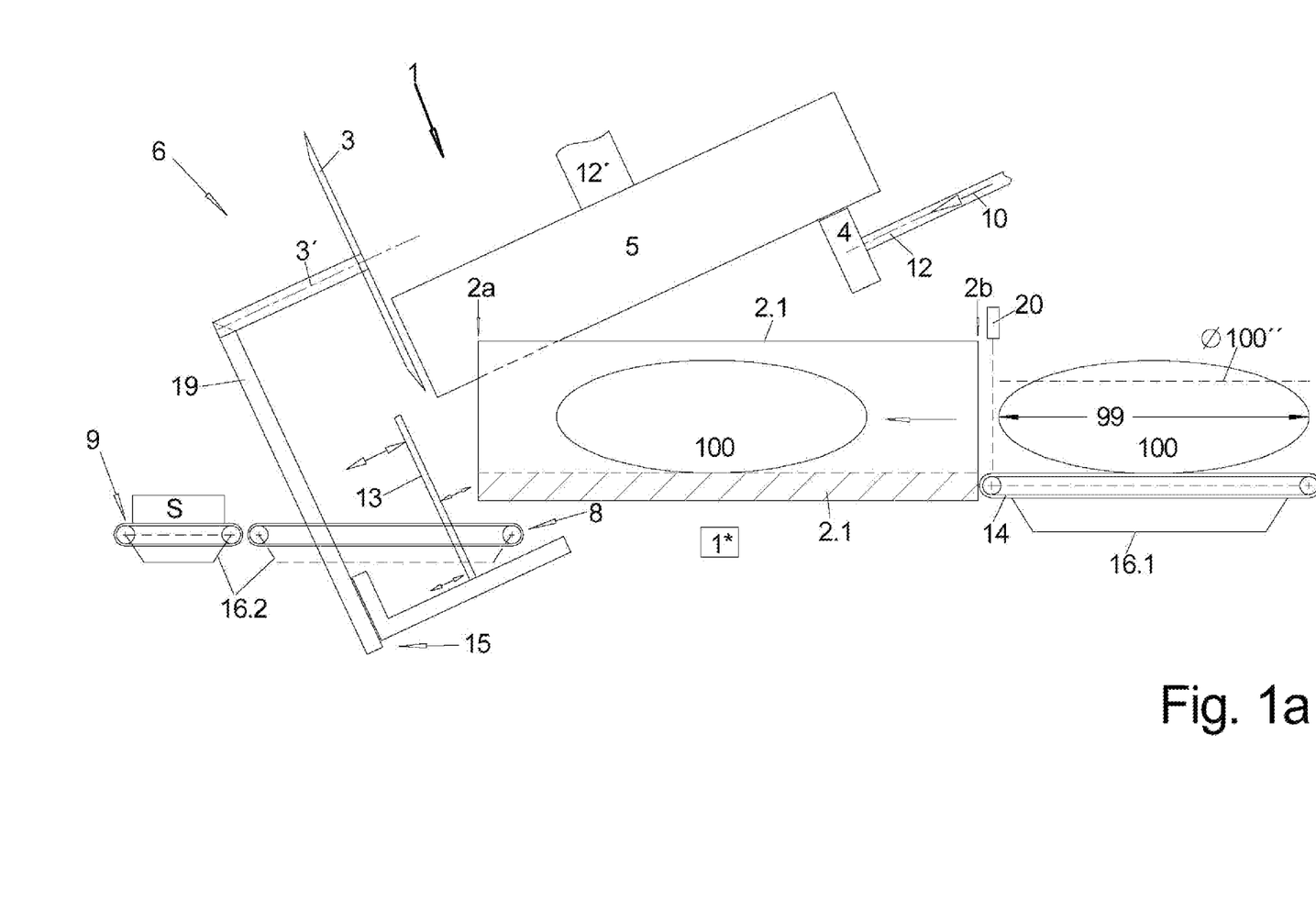
FIGS. 1a-c: a machine for pressing and slicing loaves in side view in partial section in different functional positions.
Figure 1B:
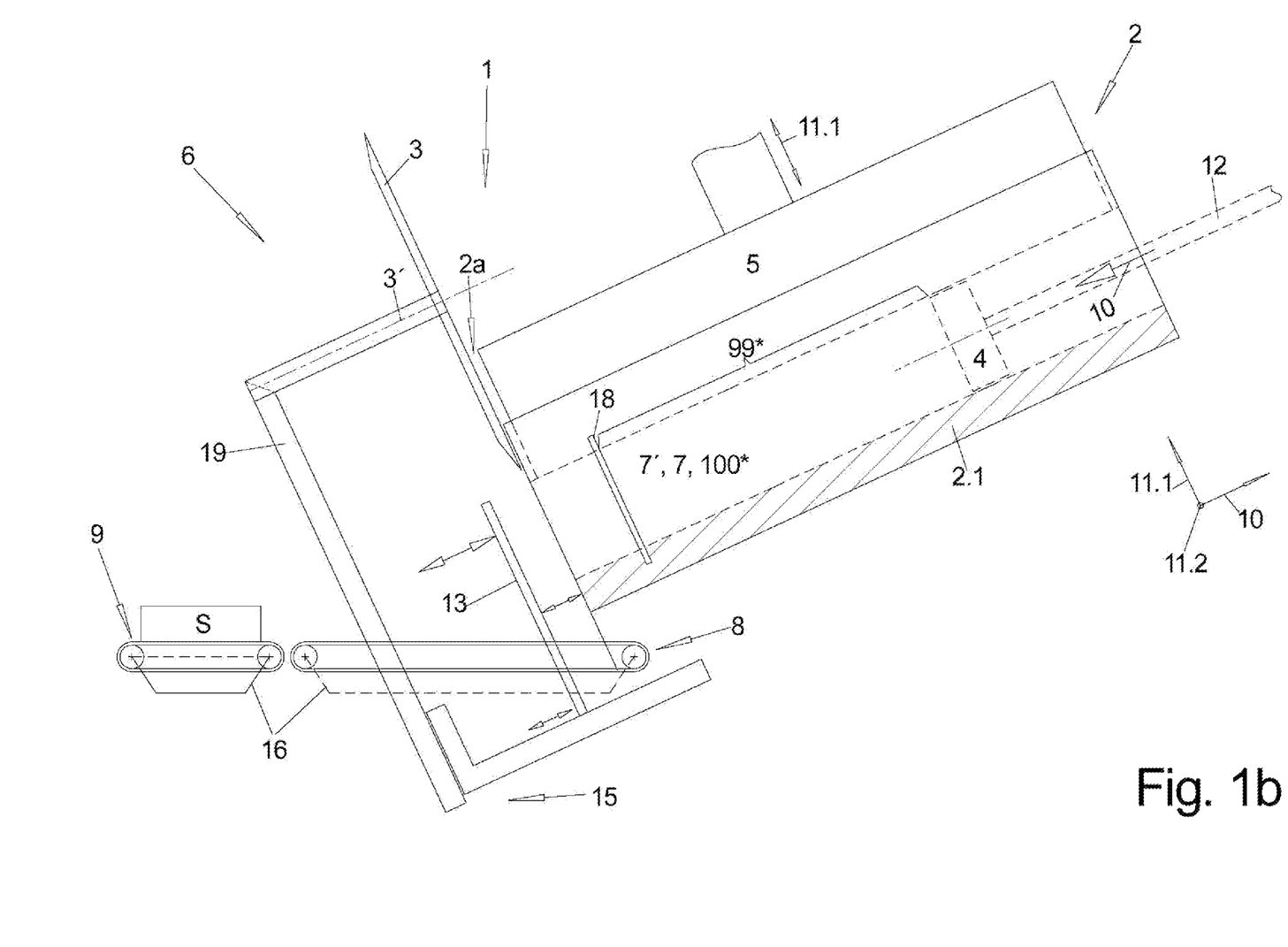

In FIGS. 1a, b—as can best be seen in FIG. 1b—the entire cutting machine 1 is shown, which, in addition to the forming tube 2 and the pressing stamps 4, 5, comprises a cutting unit 6 for cutting slices 101 from the pressed product caliber 100*.

With regard to the forming tube 2, it can be seen that the forming tube 2 in FIG. 1b is arranged inclined downwards, and in addition, near the cutting end 2a of the forming tube 2, an intermediate plate 18 can be inserted in the forming tube 2 in such a way that it closes its entire free cross-section 7' of its inner free space 7. Though, when the product piece 100 is pressed, it does not have to be pressed against the stop plate 13 moved up against the forming tube 2, but rather against this intermediate plate 18 mounted more stable in the forming tube 2 itself.

Since their position in longitudinal direction 10 is known, it is nevertheless possible to conclude from the positions of the pressing stamps 4, 5 in their pressing directions 10, 11.1 in the pressed state to the length 99 of the product piece 100 in longitudinal direction 10 and its cross-sectional area 100' and shape of the cross-section in the transverse directions 11.1, 11.2, which are at right angles to each other and perpendicular to longitudinal direction 10.

As FIG. 1a shows, in order to facilitate loading, the forming tube channel 2.1 can be tilted down into a horizontal position about a pivot axis located in its front region, in this case the lower edge at the cutting end 2a of the forming tube 2, and extending in the second transverse direction 11.2, while transverse press stamp 5 and longitudinal press stamp 4 remain in the original position.

In this tilted-down arrangement of the forming tube channel 2.1, a new product piece 100 can be approached from the rear, loading end 2b to the forming tube channel 2.1—for example by means of the feed conveyor 14 shown—and pushed into the latter.

At least the beginning and end of the product piece can be detected by a light barrier 20 or a laser line directed at the feed conveyor 14 from above as it passes through, whereupon the length 99 of the product piece 100 in the unpressed state is known on the basis of the speed of the conveyor 14.

The weight can be determined by equipping the infeed conveyor 14 with a scale 16.1.

From the weight and the length 99, the control 1* can calculate the average cross-section (Ø 100") of the unpressed product piece 100.

The forming tube channel 2.1 with the product piece 100 is then tilted back up into the pressing position running parallel to the longitudinal pressing direction 10, with the transverse press stamp 5 and longitudinal press stamp 4 each in their maximum retracted position, in which they are just dipped in this forming tube channel 2.1 so as not to collide with the unpressed product piece 100 located therein when the forming tube channel 2.1 is swiveled up.

Figure 2A:
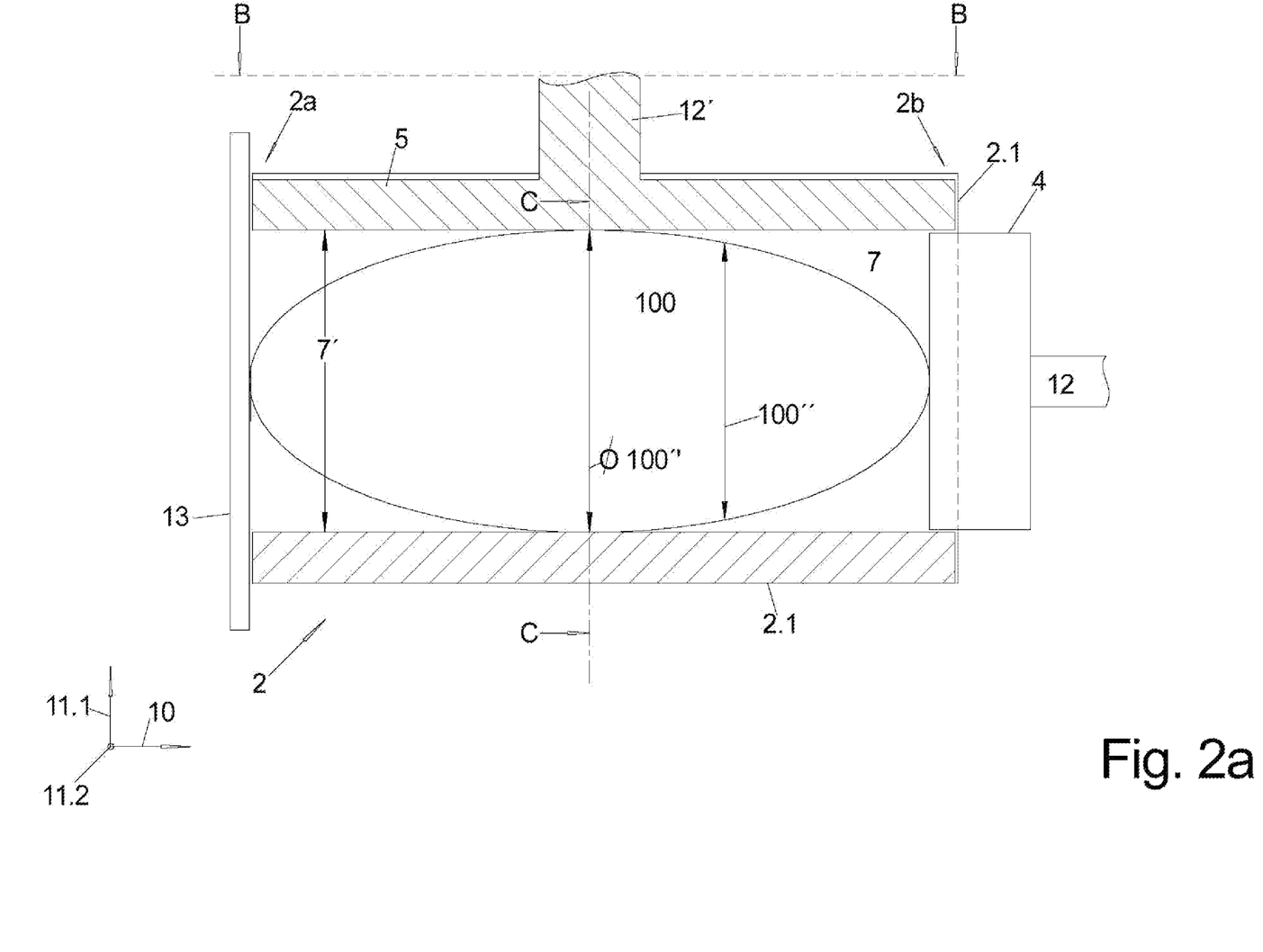
FIG. 2a: a sectional side view of a forming tube.
Figure 2B:
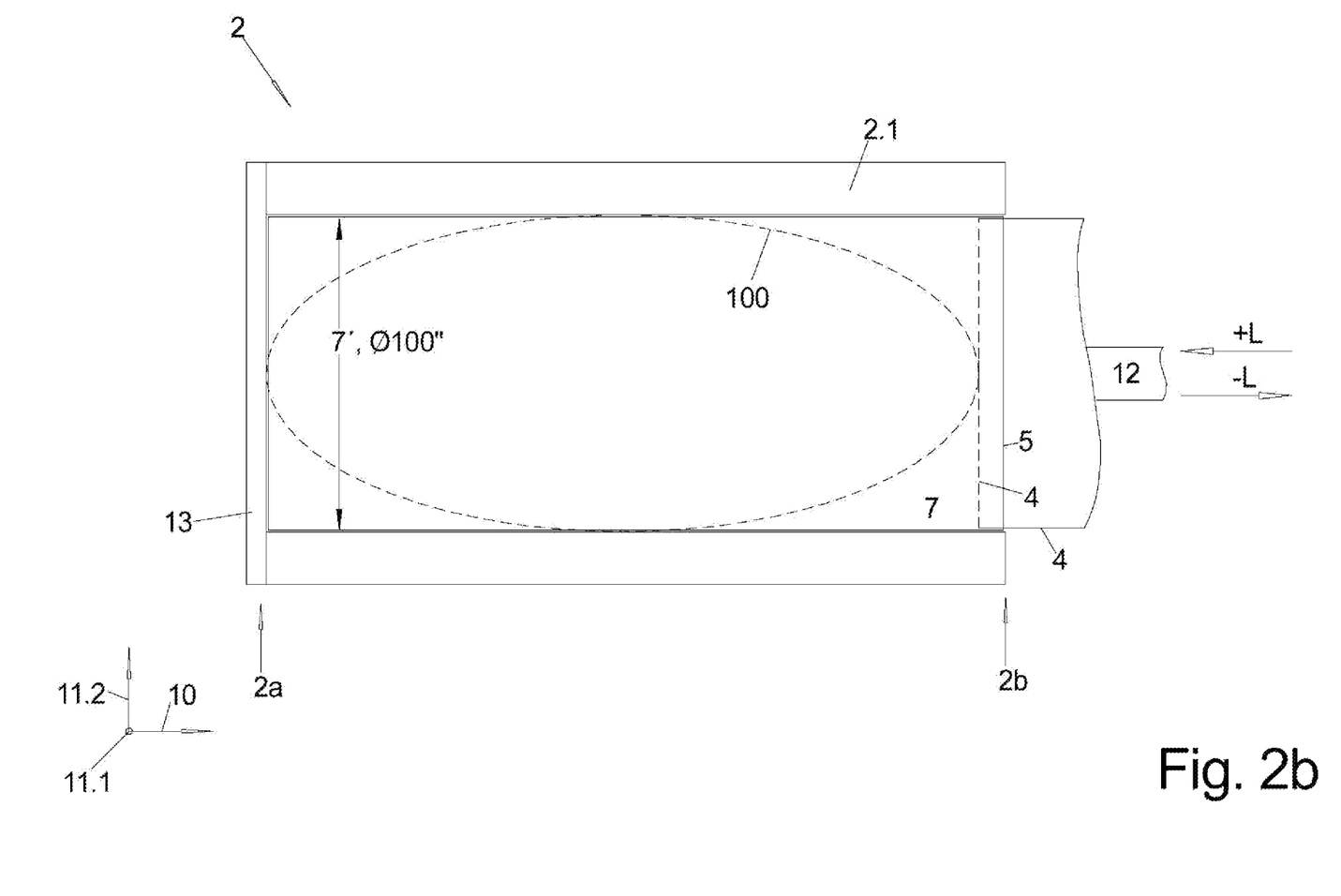
FIG. 2b: the forming tube cut along the line B-B of FIG. 2a, FIG. 2c: the forming tube cut along the line C-C of FIG. 2a, FIG. 2d: a multitrack forming tube with variable width.
Figure 2C:
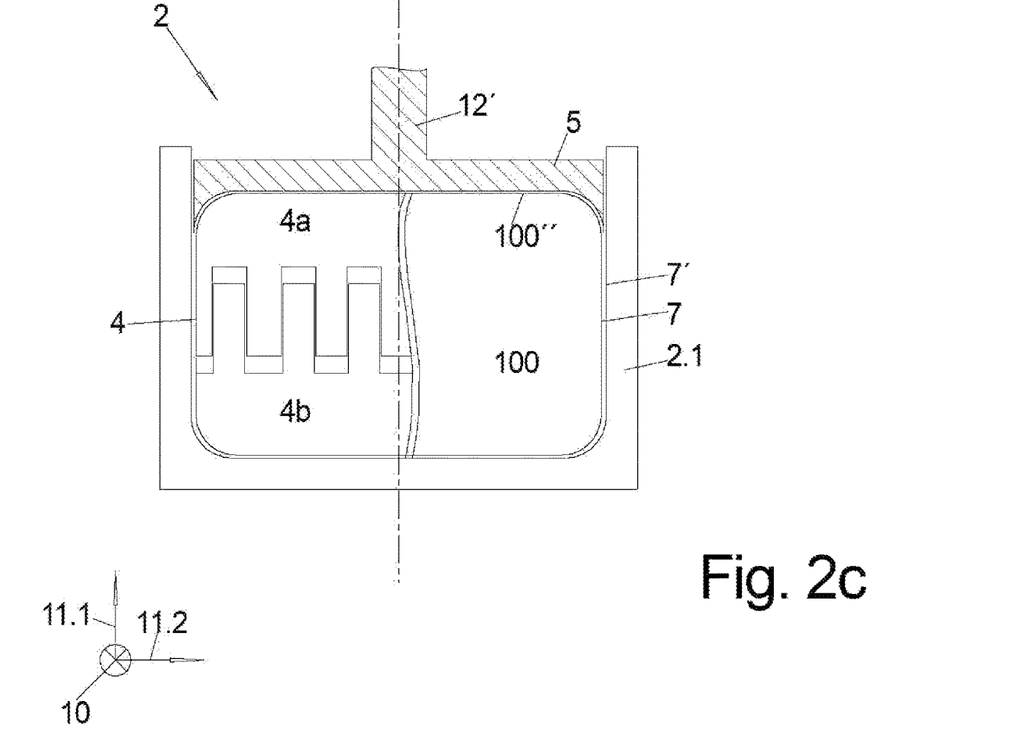

FIGS. 2a and 2b show the forming tube 2 alone in principle representation in a vertical longitudinal section and in top view, The forming tube channel 2.1 is—as shown in the cut transversely to the longitudinal direction 10 according to FIG. 2c—a forming tube channel 2.1 which is U-shaped in this cross-section and into which a transverse press stamp 5 is inserted with a precise fit from the open side, generally from above, which together form the forming tube 2 which is open at the front and rear ends.

As FIG. 2c shows, the inner surfaces of the side walls of the U-shaped forming tube channel 2.1 run parallel to each other, and in FIG. 2c at a non-variable distance, so that the transverse press stamp 5 can have a fixed width in the direction of the width of the opening of the forming tube channel 2.1, the second transverse direction 11.2, and likewise can have a fixed length in the direction 10, for example corresponding to the length of the forming tube channel 2.1.

In FIG. 2a the transverse press stamp 5 is approached to such a distance from the bottom of the forming tube channel 2.1 that the free cross-section 7' there between corresponds to the average cross-section of the unpressed product piece 100. Consequently, the product piece 100 is already somewhat compressed in the transverse direction 11.1 and has a length which—without pressing force in the longitudinal direction 10—is somewhat greater than the length 99* in the unpressed state. However, the product piece 100 still has qualitatively, according to its initial state, an approximately elongated-ovoid shape or also the shape of an American football, with a cross-section 100" which changes in longitudinal direction 10 and is still larger in the middle length range than at its ends.

With such an adjustment of the inner free cross-section 7', the product piece 100 is then, as shown in FIG. 1b, first pushed forward against the intermediate plate 18 or, as shown in FIG. 2b, against the stop plate 13 at the front end 2a of the forming tube 2 by means of the longitudinal press stamp 4.

Only by further forward movement of the press stamps 4, 5 the product piece 100 is compressed to the product caliber 100* shown in FIG. 1b in the longitudinal direction 10 until the entire forming cavity 7 of the forming tube 2 is filled up to the stop 13 or 18 by the material of the product piece 100, which then has a significantly shorter length 99*.

The measurement of the length and the cross-section of the product caliber 100* in the compressed state is, however, as described, not carried out with the force, in particular at the longitudinal press stamp 4, which was necessary for the compression, but with a measuring force which is considerably lower in comparison.

Figure 1C:
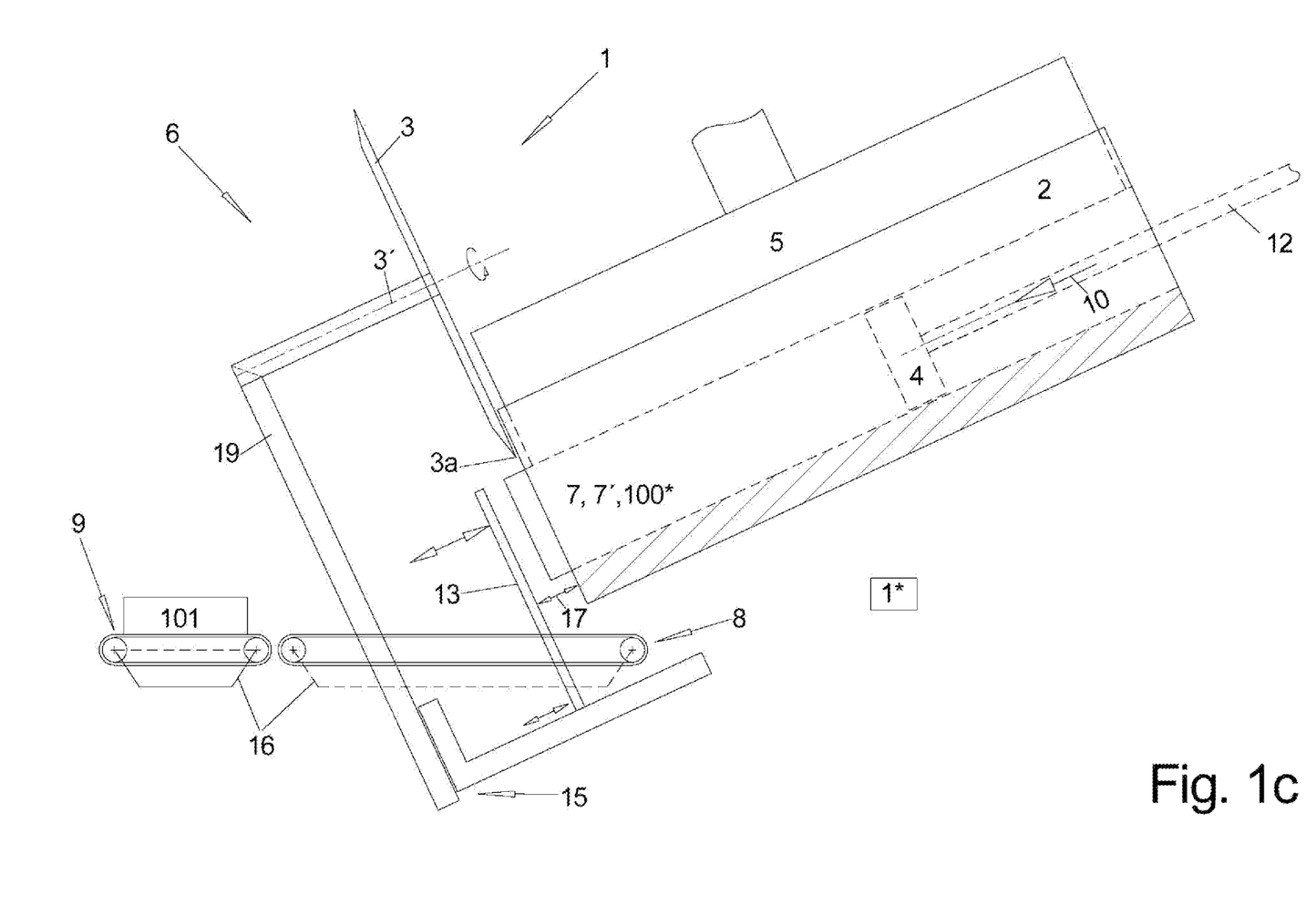

FIG. 1c shows the subsequent automatic cutting of the pressed product caliber 100* into slices 101 after removal of the intermediate plate 18:

For this purpose—after removal of the intermediate plate 18—the pressed product caliber 100* is pushed further forward by means of the longitudinal press stamp 4 with a cutting force which preferably corresponds to the measuring force, namely beyond the cutting end 2a of the forming tube 2 by a desired slice thickness, so that the product caliber 100* should rest with its front end face against a stop plate 13 set at a corresponding distance 17 from the forming tube 2.

When, in the longitudinal direction 10, the position of the product caliber 100* for cutting off the next slice 101 has been reached, the cutting edge 3a of a round or sickle-shaped blade 3, rotating in this case about a blade axis 3', dips increasingly in the transverse direction 11.1 into the cross-section of the product caliber 100* and cuts off a slice 101.

As the blade 3 dips, the stop plate 13 is also moved in the same transverse direction, so that the separated slice 101 can tip down over the upper edge of the stop plate 13 and fall onto the discharge conveyor 8 located immediately below, which transports it away and transfers it to another discharge conveyor 9. One of the two discharge conveyors, preferably the downstream discharge conveyor 9, comprises a scale 16 for weighing the individual discs 101 produced, and their weight can be fed back to the control 1* of the machine 1 for automatic correction of the thickness of the subsequent discs 101 by changing the distance 17.

For this purpose, both the blade 3 and the stop plate 13 are movably mounted on a base frame 15 of the cutting unit 6, along which the stop plate 13 is adjustable in its distance 17 in the longitudinal direction 10, and along which the blade 3, which is held on a support arm 19, is also movable at least in one of the transverse directions to the longitudinal direction 10, preferably the first transverse direction 11.1, the transverse pressing direction of the transverse press stamp 5.

In order to close the free cross-section 7' between the forming tube channel 2.1 and the transverse press stamp 5, the longitudinal press stamp 4—which is, after all, arranged between the transverse press stamp 5 and the forming tube channel 2.1 during pressing or forward pushing—consists for example—as shown in FIG. 2c, left half—of two parts 4a, 4b, which on the side facing each other have alternating prongs and recesses which dip into each other, so that the transverse press stamp 5 can thereby change its extension in this transverse direction 11.1, which happens automatically, since the two parts 4a, 4b are pretensioned by means of springs in the direction pointing away from each other.

Figure 2D:
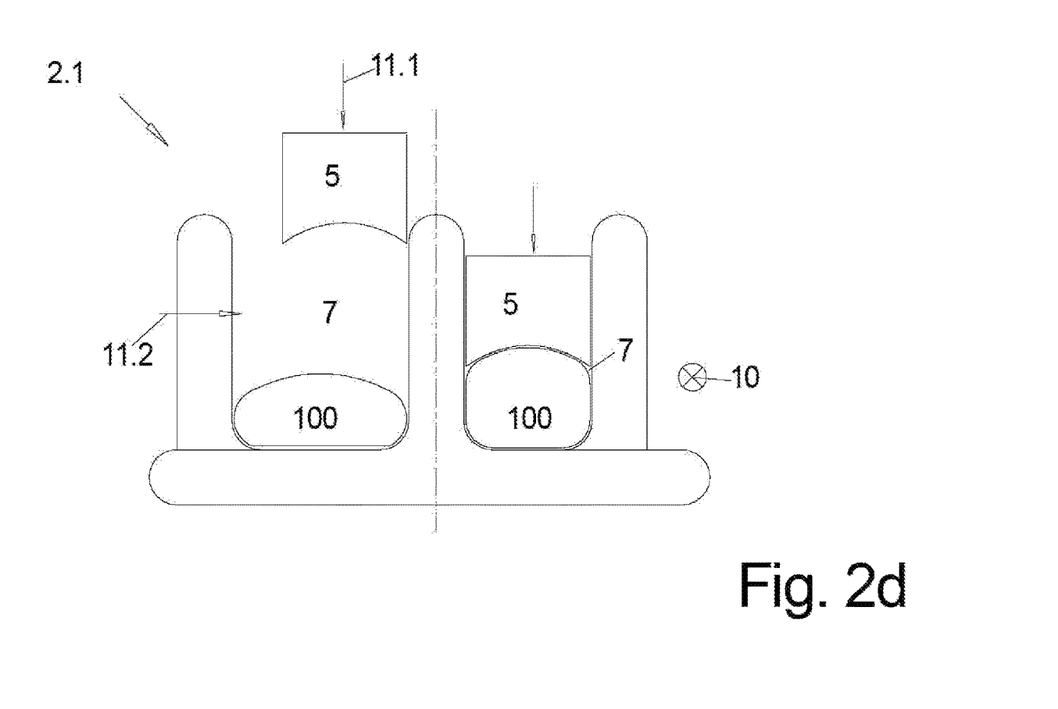

FIG. 2d shows how, for cutting two product pieces 100 side by side 2, two forming tube channels can be present, the middle one of three side walls projecting from a bottom being fix, in particular integrally, connected to the latter, the two outer side walls, on the other hand, movable in the 2nd transverse direction 11. 2 from a large distance for insertion of the product piece 100 and a smaller distance for subsequent pressing of the product piece 100, which then also corresponds to the width of the transverse press stamp 5 to be inserted from above into the respective forming tube channel 2.1.

LIST OF REFERENCES 1 cutting machine
1* control
2 forming tube
2.1 forming tube channel
2a cutting end
2b loading end
3 blade
3' blade axis
3" blade plane
3a cutting edge
4 longitudinal press stamp
5 cross press stamp
6 cutting unit
7 internal free space
7' inner free cross section
8 discharge conveyor
9 discharge conveyor
10 longitudinal direction, axial direction, feed direction
11.1 1. transverse direction
11.2 2. transverse direction
12, 12' piston rod
13 stop plate
14 feed conveyor
15 base fstampe
16 scale
17 distance
18 intermediate plate
19 support arm
20 light barrier
99 unpressed length
99* pressed length
100 unpressed product piece
100* pressed product caliber
100" cross section
100" max maximum cross section
101 slice
Dmax maximum thickness, maximum diameter
K measuring force
K feed force

The invention claimed is:

1. A method of forming an irregularly shaped, elongated product piece of a partially elastic material, the method comprising:
    pressing the product piece
        in a longitudinal direction and
        in at least one transverse direction relative to the longitudinal direction
    in a forming tube to form a product caliber which has a cross-section which is largely uniform over its length, wherein
    before the pressing of the product piece
        its weight as well as its length in a feed direction are determined,
        from the weight and the length, an average cross-section of the product piece in an unpressed state is determined,
        the product piece is inserted into the forming tube,
        then an inner free cross-section of the forming tube is set to a value that corresponds to the average cross-section.

2. The method according to claim 1,
    wherein
        the value deviates from the average cross-section by a maximum of +/−30%.

3. The method according to claim 2, wherein the value deviates from the average cross-section by a maximum of +/−20%.

4. The method according to claim 3, wherein the value deviates from the average cross-section by a maximum of +/−10%.

5. The method according to claim 4, wherein the value deviates from the average cross-section by a maximum of +/−5%.

6. The method according to claim 2, wherein the value deviates from the average cross-section only upwards.

7. The method according to claim 1,
    wherein
        deviation of the forming tube cross-section to be adjusted relative to the average cross-section of the product piece in the unpressed state is carried out as a function of a shape of the product piece in the unpressed state,
        in particular, the greater the cross-section in an average length region is relative to the cross-section at ends of the product piece in the unpressed state, the greater the deviation.

8. The method according to claim 1,
    wherein
        the pressing is carried out in the forming tube, which has a circumferentially closed forming tube cavity that is open at both ends and has a constant cross-section along its longitudinal direction, with
        a transverse stamp which is movable in a transverse direction of the forming tube, and a longitudinal stamp movable in the longitudinal direction of the forming tube.

9. The method according to claim 7, wherein
a control parameter for a pressing stroke for each stamp is a pressing force or a position of the stamp in its pressing direction.

10. The method according to claim 7, wherein
the pressing is continued in each pressing stroke until a predetermined stroke target value of the control parameter is reached for this stroke,
the pressing is continued as a whole until a final target value of the control parameter is reached.

11. The method according to claim 10, wherein
during a pressing stroke, the pressing is stopped, if a feed speed of the stamp to which the stroke target value of the pressing force is applied drops below a predetermined limit value.

12. The method according to claim 8, wherein
in another transverse direction, which is perpendicular to the transverse direction, a transverse limiting stamp is applied at least to the leaf product piece.

13. The method according to claim 1, wherein
a target thickness of slices for a predetermined slice weight is determined from a length and a cross-section of the product caliber determined in a pressed state,
the product caliber is cut into slices with a thickness setting, which is to yield slices with the target thickness,
wherein
the cutting is carried out with a feed force which is equal to or higher than a measuring force.

14. A method of forming an irregularly shaped, elongated product piece from a partially elastic material, the method comprising:
pressing the product piece
in a longitudinal direction and
in at least one transverse direction relative to the longitudinal direction
in a forming tube to form a product caliber which has a cross-section which is largely uniform over its length,
wherein the pressing is performed using first and second pressing stamps, and wherein after pressing of the product piece up to a caliber pressing force for each of the pressing stamps,
a holding force on each of the pressing stamps is set to a value below 50% of a maximum pressing force or a caliber pressing force, and
measuring of the product caliber is carried out with a measuring force for each pressing stamp whose value lies in a range of the holding force of the pressing stamp.

15. The method according to claim 14, wherein
the measurement of the product caliber is carried out based on position of the pressing stamps only after the product caliber has been subjected to the holding force for each pressing stamp for a predetermined holding time of at least 0.1 s.

16. The method according to claim 7, wherein
the holding force for each pressing stamp is adjusted to a value between 10% and 40% of the maximum pressing force or the caliber pressing force.

17. The method according to claim 14, wherein, for each pressing stamp,
the measuring force is at most 20% above the value of the holding force.

18. The method according to claim 17, wherein, for each pressing stamp, the measuring force is at most 10% above the value of the holding force.

19. The method according to claim 18, wherein, for each pressing stamp, the measuring force is at most 5% above the value of the holding force.

20. A slicing machine for bringing an irregularly shaped product piece made of an elastic material into a shape with a cross-section which is largely uniform over its length and for subsequently slicing the product piece into weight-accurate, slices, the slicing machine comprising:
a forming tube open at a front and rear and extending in a longitudinal direction for receiving a product piece,
a longitudinal press stamp which can be displaced forwards and backwards in the forming tube from a rear loading end in the longitudinal direction of the forming tube,
a transverse press stamp as part of a wall of the forming tube, which can be pushed into a forming tube channel radially in a transverse pressing direction of the forming tube,
an axial stop for the product piece is provided at a front cutting end of the forming tube or in a front end region of the forming tube,
a blade is provided for cutting off a slice from the product piece in front of the front cutting end of the forming tube,
a control to control all moving parts of the machine, wherein
the control is operable to determine an average cross-section of the product piece in an unpressed state based on weight and length of the product piece in the unpressed state, and the control is embodied to control the longitudinal press stamp to press the product piece in the longitudinal direction, and to control the transverse press stamp to press the product piece in the transverse pressing direction to form a product caliber in the forming tube which has a cross-section which is largely uniform over its length.

* * * * *